United States Patent
Trowbridge et al.

(10) Patent No.: US 8,348,241 B2
(45) Date of Patent: Jan. 8, 2013

(54) ADJUSTABLE JACK MOUNT

(75) Inventors: Todd Trowbridge, Marathon, WI (US); Todd Walstrom, Weston, WI (US); Eric Anderson, Plover, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 242 days.

(21) Appl. No.: 12/709,755

(22) Filed: Feb. 22, 2010

(65) Prior Publication Data

US 2010/0213427 A1 Aug. 26, 2010

Related U.S. Application Data

(60) Provisional application No. 61/208,097, filed on Feb. 20, 2009.

(51) Int. Cl.
*B60S 9/02* (2006.01)
(52) U.S. Cl. .................................. 254/420; 254/418
(58) Field of Classification Search .................. 254/420, 254/418, 419, 423–425
See application file for complete search history.

(56) References Cited

U.S. PATENT DOCUMENTS

| | | | |
|---|---|---|---|
| 2,712,453 A | 7/1955 | Dion | |
| 3,595,527 A * | 7/1971 | Douglass | 254/420 |
| 3,841,663 A * | 10/1974 | Proffit | 280/475 |
| 3,934,852 A | 1/1976 | Weber et al. | |
| 4,176,824 A | 12/1979 | Linton et al. | |
| 4,188,049 A | 2/1980 | Kimbro | |
| 4,238,113 A | 12/1980 | Adams | |
| 4,702,458 A | 10/1987 | Kendrick | |
| 4,796,864 A | 1/1989 | Wilson | |
| 4,842,252 A | 6/1989 | McMahan | |
| 4,848,735 A * | 7/1989 | Pittman | 254/420 |
| 4,978,104 A | 12/1990 | Gipson, Jr. | |
| 5,174,550 A * | 12/1992 | Pittman | 254/420 |
| 5,421,555 A * | 6/1995 | Sims | 254/420 |
| 5,579,862 A | 12/1996 | Bowden et al. | |
| 6,361,023 B1 * | 3/2002 | Peavler | 254/424 |
| 7,192,011 B2 | 3/2007 | Meissner | |
| 7,296,784 B2 * | 11/2007 | Peter | 254/418 |
| 7,584,677 B1 * | 9/2009 | Johnson et al. | 74/89.23 |
| 2009/0057633 A1 * | 3/2009 | Beck et al. | 254/420 |
| 2010/0187489 A1 * | 7/2010 | Hebert | 254/420 |
| 2010/0213427 A1 * | 8/2010 | Trowbridge et al. | 254/420 |

* cited by examiner

*Primary Examiner* — Lee D Wilson
(74) *Attorney, Agent, or Firm* — McDonald Hopkins LLC

(57) ABSTRACT

A mounting adapter for mounting a jack to a trailer coupler and/or a trailer frame is described. The mounting adapter may permit the jack to mount to the trailer coupler while retaining both vertical and axial adjustability. The mounting adapter may include a flange and a collar. The flange may include an opening for receiving the jack and at least one mounting aperture for attachment with the trailer frame. The collar may extend outward from the flange and have at least one aperture for attachment with the jack. The collar may also include a rib located for engagement with a slot on the jack. The trailer coupler and frame may include apertures alignable to the mounting apertures, whereby the mounting apertures may permit orientation of the jack to be forward, left, right or rear facing. The mounting adapter may also be vertically adjustable to the jack.

25 Claims, 4 Drawing Sheets

ADJUSTABLE JACK MOUNT

CROSS-REFERENCE TO RELATED APPLICATION

This application claims benefit from U.S. Provisional Patent Application No. 61/208,097, entitled "Adjustable Jack Mount," filed on Feb. 20, 2009, which is hereby incorporated by reference in its entirety.

FIELD OF THE INVENTION

The present invention is generally related to trailer jacks and, more particularly, to trailer jack mounting adapters and assemblies.

BACKGROUND OF THE INVENTION

Cars, trucks, and sports utility vehicles are frequently used as towing vehicles to transport a towed vehicle, such as a trailer. Trailers are often designed to secure and haul cargo and be towed behind a towing vehicle. Trailers may be arranged to haul specific types of cargo such as boats, automobiles, consumer products, and the like.

Towed vehicles or trailers are typically supported by a frame that may be attached to the towing vehicle. A portion of the trailer frame may extend beyond the body of the trailer, toward the towing vehicle. This extended portion, called the tongue, may usually be formed by connecting two pieces of the trailer frame at a predetermined angle. Typically, a trailer frame coupler may then be attached to the tongue of the trailer. The trailer frame coupler may be shaped and sized to be connected to or engaged with a portion of the towing vehicle, such as a hitch ball.

Jacks and jack assemblies have long been used with towed vehicles or trailers. Typically, a jack assembly may be secured to a trailer, such as to the tongue of the trailer. The jack assembly may be utilized to assist in supporting or stabilizing the towing trailer in a level horizontal position while the trailer is uncoupled or detached from the towing vehicle by elevating one end of the trailer off the ground. In addition, a jack assembly may often be used to assist in engaging the towing trailer with the towing vehicle or disengaging the towing trailer from the towing vehicle. A jack assembly may also be utilized to change the vertical position or height of the tongue of a trailer, since the tongue may be mounted onto or dismounted from the hitch of a towing vehicle.

Typically, a jack or jack assembly may be mounted to the trailer tongue or directly to the frame coupler of a trailer. Traditional trailer frame couplers may include any appropriate means for securing or connecting the jack to the trailer coupler. Depending on the height of the trailer or jack being used, however, it may be advantageous to mount the jack at different heights relative to the trailer frame. It may also be advantageous to mount the jack at a specific orientation in order to allow various features of the jack, such as a handle, to be accessible.

SUMMARY

A mounting adapter for mounting a jack to a trailer coupler and/or a trailer frame is described. The mounting adapter may permit the jack to mount to the trailer coupler while retaining both vertical and axial adjustability. The mounting adapter may include a flange and a collar. The flange may include an opening for receiving the jack and at least one mounting aperture for attachment with the trailer frame. The collar may extend outward from the flange and have at least one aperture for attachment with the jack. The collar may also include a rib located for engagement with a slot on the jack. The trailer coupler and frame may include apertures alignable to the mounting apertures, whereby the mounting apertures may permit orientation of the jack to be forward, left, right or rear facing. The mounting adapter may also be vertically adjustable to the jack.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

Figure 4:
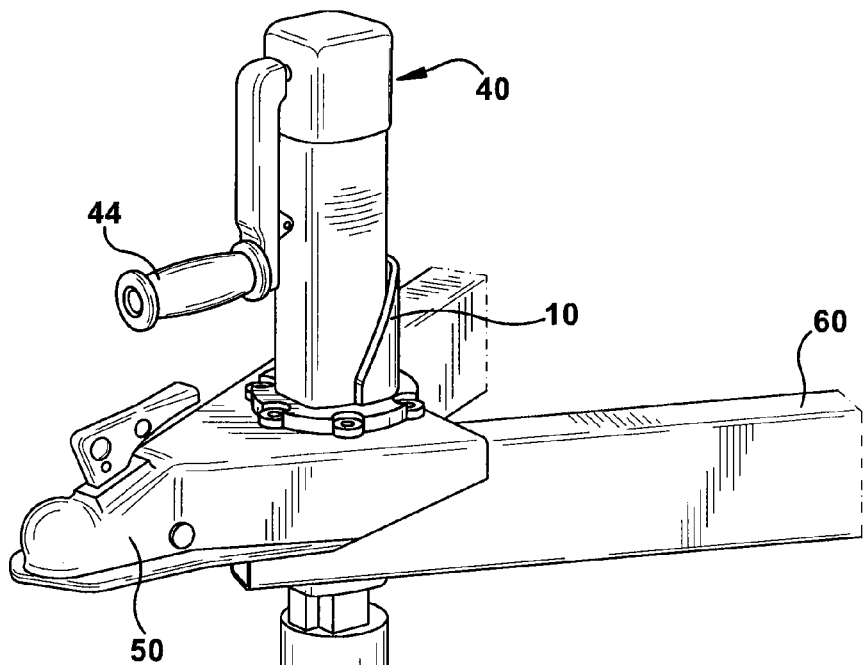
FIG. 4 illustrates a perspective view of a jack assembly and trailer frame coupler connected to a trailer with the mounting adapter of FIG. 1 having a center handle orientation.
Figure 5:
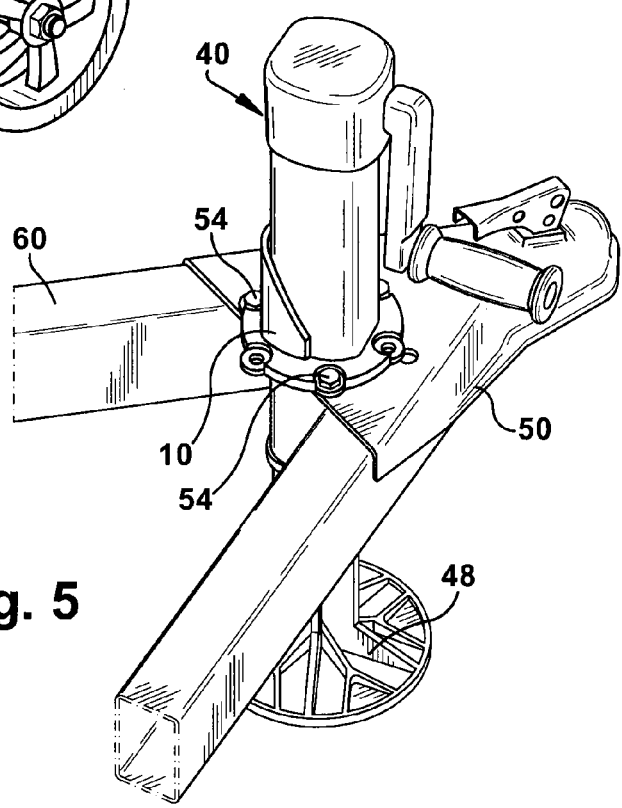
FIG. 5 illustrates a perspective view of a jack assembly and trailer frame coupler connected to a trailer with the mounting adapter of FIG. 1 having a passenger-side handle orientation.
Figure 6:
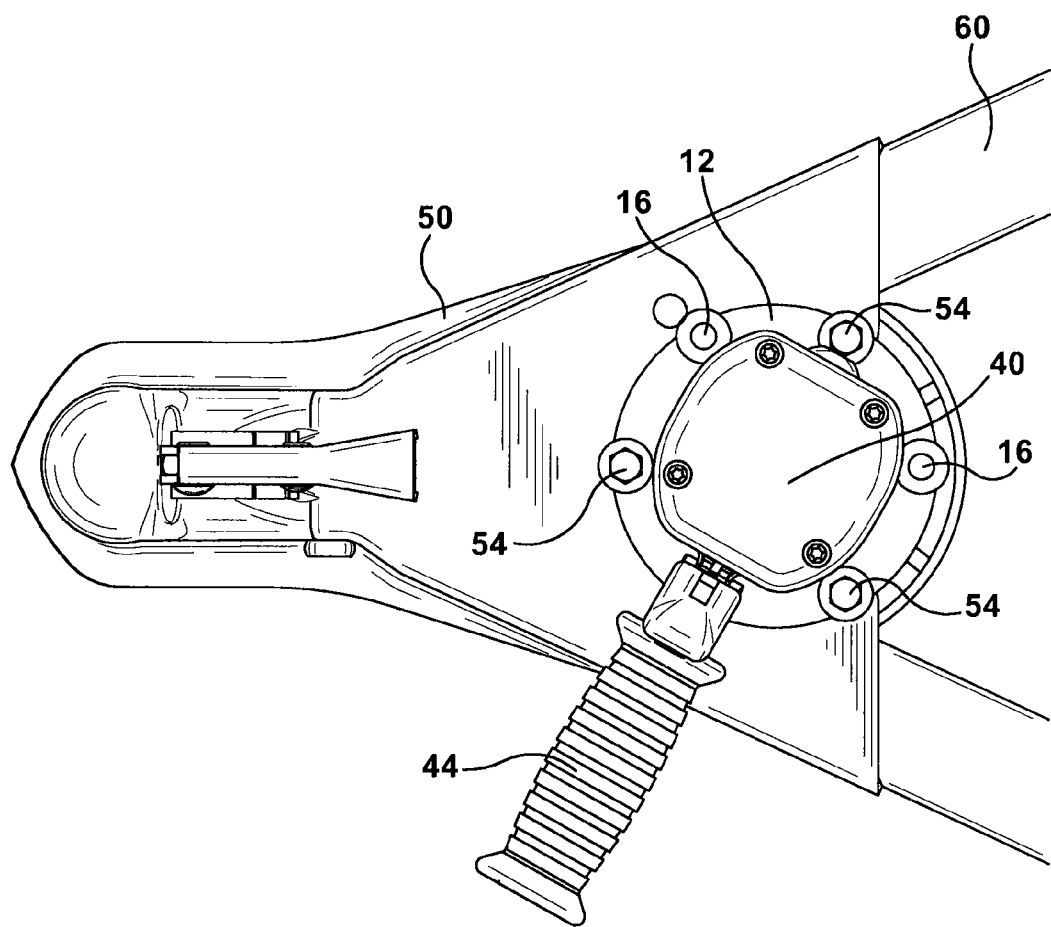
FIG. 6 illustrates a perspective view of a jack assembly and trailer frame coupler connected to a trailer with the mounting adapter of FIG. 1 having a driver-side handle orientation.

An adjustable jack mount or mounting adapter 10 for connecting a jack or jack assembly 40 to a trailer frame 60 is illustrated in FIGS. 1, 2 and 4-6. For example, the mounting adapter 10 may connect the jack 40 to a trailer frame coupler 50, whereby the trailer frame coupler 50 may be connected to the trailer frame 60 (FIGS. 4-6). The mounting adapter 10 may allow for the height of the jack 40, trailer frame coupler 50 and trailer frame 60 to be adjusted. The adjustable mounting adapter 10 may be fabricated by any appropriate means and out of any appropriate material. For example, the adjustable mounting adapter 10 may be fabricated as a one piece construction or may be fabricated out of several pieces that may be secured together by any appropriate means, such as welding, fasteners or the like.

Figure 1:
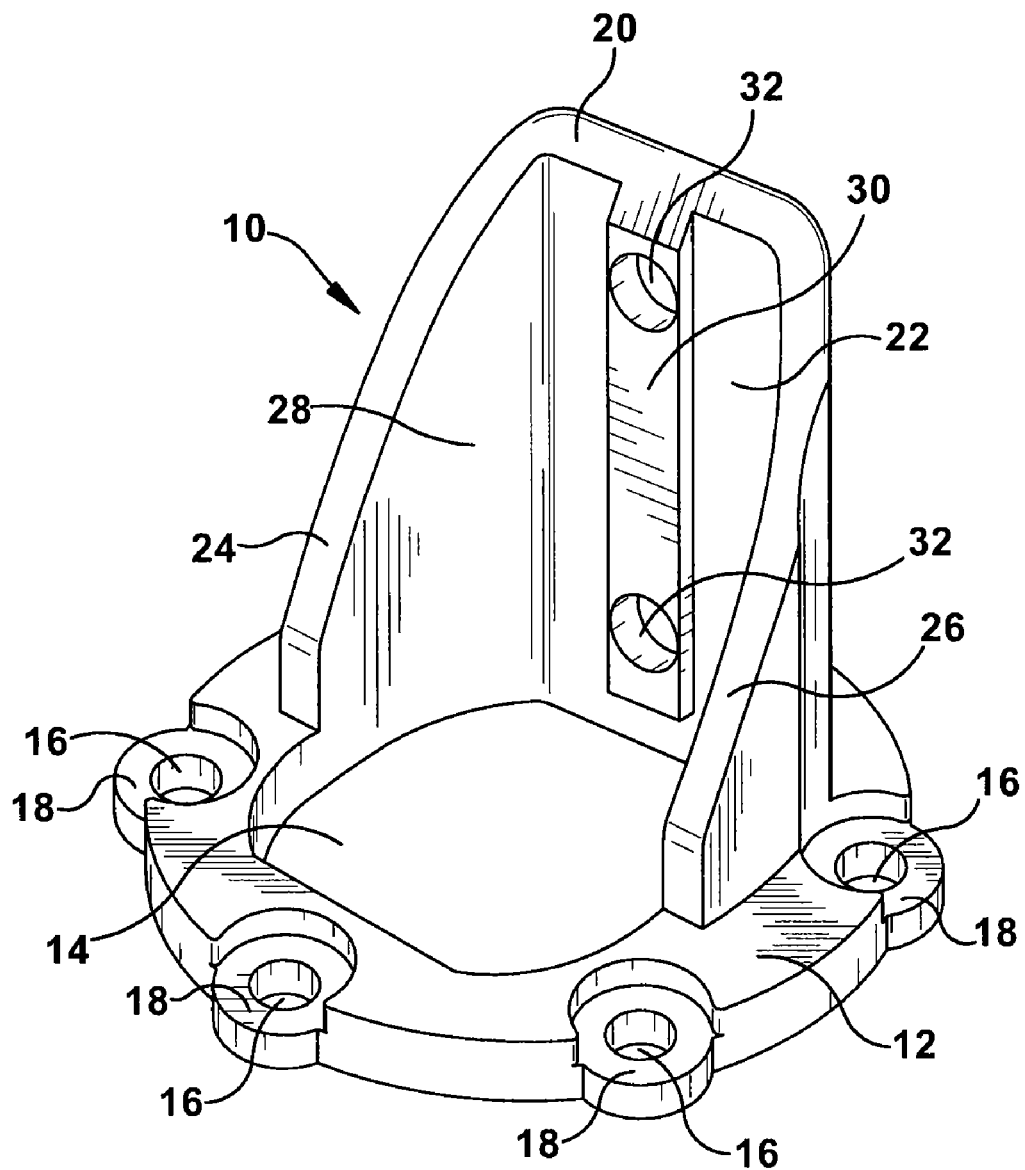
FIG. 1 illustrates a perspective view of an adjustable jack mount or mounting adapter.
Figure 2:
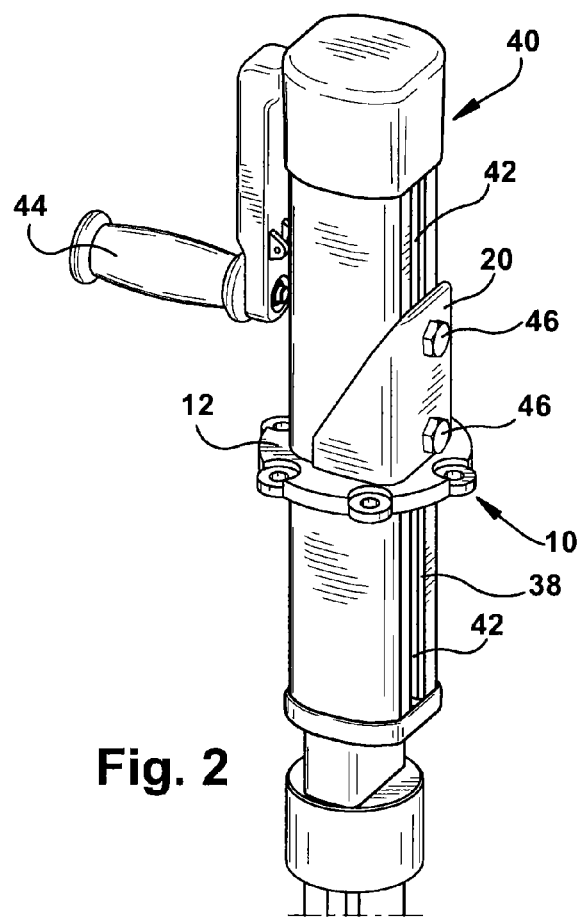
FIG. 2 illustrates a perspective view of the mounting adapter of FIG. 1 engaged with a jack assembly.

The adjustable mounting adapter 10 may include a flange 12 and a collar 20 (FIGS. 1 and 2). The flange 12 may be of any appropriate shape or size, such or configuration, such as of a generally planar configuration. For example, the flange 12 may be of a generally circular, ovular, or square shape. The flange may include an opening 14 and at least one mounting aperture 16 (FIG. 1).

The opening 14 may be of any appropriate shape or size, such as a generally circular, ovular, or square shape or any combination thereof. For example, the opening 14 may be shaped and sized to receive a portion of a jack or jack assembly 40, whereby the opening 14 may be any shape corresponding to the cross-sectional shape of an appropriate jack 40 (FIGS. 2, 4 and 5). A description of a jack assembly is set forth in U.S. Publication No. 2008/0057633, which is herein incorporated by reference in its entirety.

The mounting apertures 16 may provide a means for being mounted to a trailer or trailer frame 60. The mounting apertures 16 may be of any appropriate shape or size, such as a generally circular or square shape. The flange 12 may include any appropriate number of mounting apertures 16, such as three, four, six, eight or the like. The mounting apertures 16 may be located at any appropriate position or be arranged in any appropriate pattern on the flange 12. For example, the mounting apertures 16 may be arranged in a general radial or circular pattern around the opening 14 (FIGS. 1, 2 and 4-6).

The flange 12 may also include any appropriate number of bores 18 (FIG. 1). The bores 18 may be of any appropriate shape or size, such as a generally circular shape. The bores 18 may be located at any appropriate position on the flange 12, such as adjacent to or surrounding each mounting aperture 16 (FIG. 1). For example, there may be a corresponding number of bores 18 to mounting apertures 16. In addition, the bores 18 may be located around each aperture 16, whereby the bores 18 may provide for an indentation or lower surface near each aperture 16 (FIG. 1). This lower surface or indentation may aid in the location of and protection of any fasteners located within the mounting apertures 16.

The collar 20 may be of any appropriate shape or size, such as a generally circular, rectangular, square or "C" shape. The collar 20 may be located at any appropriate position on the flange 12. For example, the collar 20 may extend outwardly from the flange 12, whereby the collar 20 may be generally perpendicular to the flange 12 (FIGS. 1 and 2). It will be appreciated, however, that the collar 20 may extend from the flange 12 at any appropriate direction to engage a jack 40.

The collar 20 may include a main wall 22 and at least one sidewall. For example, the collar 20 may include a first sidewall 24 and a second sidewall 26 (FIG. 1). The main wall 22 may be of any appropriate shape or size, such as a generally rectangular, square or triangular shape. The main wall 22 may be located at any appropriate position on the adjustable mounting adapter 10, such as adjacent to the opening 14 and extending outward from the flange 12 in a generally central location (FIG. 1).

The sidewalls 24, 26 may be of any appropriate shape or size, such as a generally rectangular or triangular shape. The sidewalls 24, 26 may be located at any appropriate position on the mounting adapter 10, such as being adjacent to the opening 14 and being located on each side of the main wall 22. For example, the sidewalls 24, 26 may be generally a mirror image of each other and be a generally transitional portion from the flange 12 to the main wall 22 of the collar 20 (FIG. 1).

The collar 20 may also include an inner wall 28. The inner wall 28 may be located at any appropriate position on the collar 20, such as along the inner portion of the collar 20 that may face toward the opening 14 (FIG. 1). The inner wall 28 may be configured to engage a surface portion of a jack 40. For example, the inner wall 28 of the collar 26 may be aligned flush with the opening 14 so as to receive and engage the outer portion of a jack 40 held within the opening 14. It is to be appreciated, however, that the collar 20 may extend from the flange 12 at any direction or angle preferable to engage a jack 40.

The collar 20 may further include a rib 30 (FIG. 1). The rib 30 may be of any appropriate shape or size, such as a generally square or rectangular shape. The rib 30 may be located at any appropriate position on the collar 20, such as being positioned vertically along the main wall 22 (FIG. 1). For example, the rib 30 may protrude outward from the inner wall 28, whereby the rib 30 may slidably engage with a jack 40.

The collar 20 may include at least one jack mounting aperture 32. For example, the collar 20 may include any appropriate number of jack mounting apertures 32, such as two, three, four, etc. The apertures 32 may be of any appropriate shape or size, such as a generally circular or square shape. The apertures 32 may be located at any appropriate position on the collar 20, such as being positioned vertically along the main wall 22. For example, the apertures 32 may be located through the rib 30 of the collar 20 (FIG. 1).

In operation, a portion of a jack 40 may be inserted through the opening 14 of the flange 12, whereby the collar 20 may engage the jack 40 (FIG. 2). The jack 40 may include a cross-section generally shaped and sized similar to that of the opening 14 (FIG. 2). The jack may also include a pair of inner walls 38 that may extending vertically along a length of the jack 40, whereby the pair of inner walls 38 may define a slot 42 (FIG. 2). The slot 42 may be of any appropriate shape or size, such as a generally rectangular shape. The slot 42 may be located at any appropriate position on the jack 40, such as vertically along a side of the jack 40 and between the pair of inner walls 38. For example, the slot 42 may be shaped and sized to receive the rib 30 of the mounting adapter 10 (FIG. 2).

The rib 30 of the collar 20 may be engaged and aligned with the slot 42 to allow for limited movement between the mounting adapter 10 and the jack 40. Specifically, the engagement between the rib 30 and the slot 42 may allow the jack 40 to move vertically with respect to the mounting adapter 10. The inner walls 38 of the slot 42 may engage and maintain the rib 30 therein to prevent lateral movement or axial rotation of the jack 40 with respect to the mounting adapter 10.

The mounting adapter 10 may be secured to the jack 40 at any desired height. The mounting adapter 10 may include one or more mounting apertures 32 for receiving any appropriate type of fasteners 46, such as screws, bolts or the like (FIG. 2). The fasteners or bolts 46 may be inserted through the apertures 32 of the mounting adapter 10 and may also engage the slot 42 of the jack 40 (FIG. 2).

The slot 42 may also include a plurality of threaded holes (not shown) to receive the bolts 46 and thereby secure the mounting adapter 10 at any appropriate or desired discrete locations. Additional fasteners, such as nuts (not shown) may also be held within the slot 42 to receive and secure the bolts 46 therein. The nuts may be slidable within the slot 42, thereby creating an infinite number of mounting locations for the mounting adapter 10 along the length of the slot 42 of the jack 40.

Figure 3:
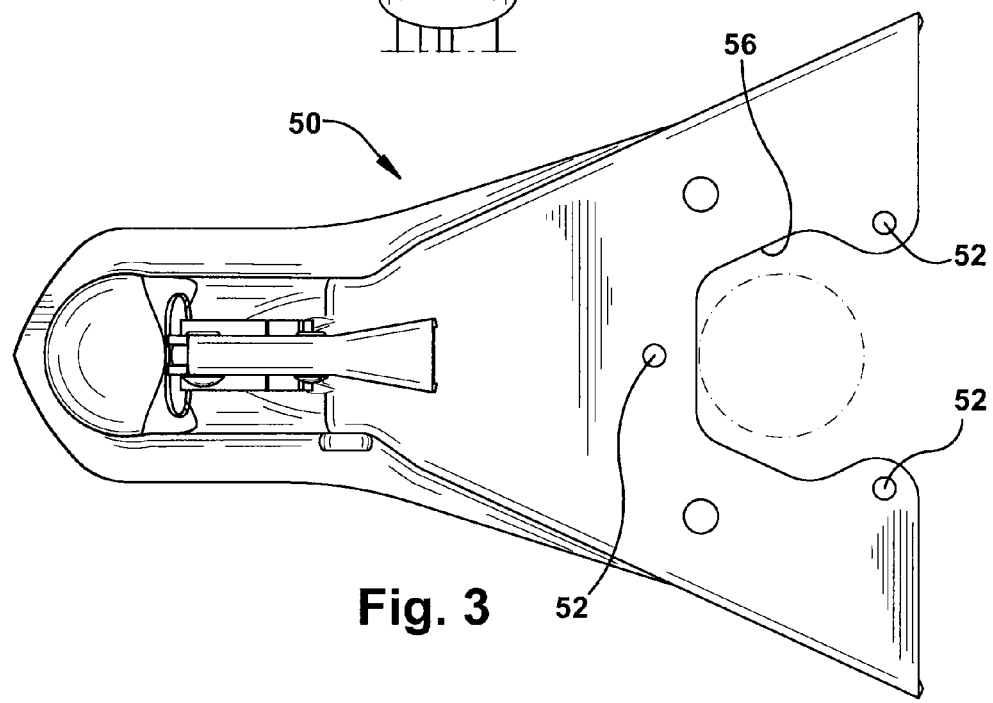
FIG. 3 illustrates a top view of a trailer frame coupler.

The mounting adapter 10 may be utilized to secure the jack 40 to a trailer frame coupler 50 (FIGS. 4-6). The trailer frame coupler 50 may be of any appropriate shape, type or configuration. The frame coupler 50 may include an opening or cut out 56 and at least one aperture 52 (FIG. 3). The opening or cut out 56 may be of any appropriate shape or size, such as a generally circular, triangular or square shape. For example, the opening 56 may be shaped and sized to receive a portion of the jack 40, whereby the opening 56 may be any shape corresponding to the cross-sectional shape of an appropriate jack 40 (FIG. 3).

The frame coupler 50 may include any appropriate number of apertures 52, such as two, three, four, etc. The apertures 52 may be of any appropriate shape or size, such as a generally circular or square shape. For example, the apertures 52 may be of a corresponding shape and size as the apertures 16 of the mounting adapter 10. The apertures 52 of the coupler 50 may be located at any appropriate position or be arranged in any appropriate pattern on the coupler 50 (FIG. 3). For example, the mounting apertures 52 may be arranged in a general radial or circular pattern around the opening 56.

The mounting adapter 10 may include a plurality of mounting apertures 16 that may be configured to align with the apertures 52 in the trailer frame coupler 50. The frame coupler 50 may be mountable to a trailer frame 60 (FIGS. 4-6). The trailer frame 60 may be of any appropriate shape, type or configuration, such as a generally tubular frame having an A-frame shape (FIGS. 4-6). The trailer frame 60 may be connected or engaged with a hitch ball (not shown) located on a towing vehicle (not shown), such as a car or tuck.

The jack 40 may include a handle 44 (FIGS. 2 and 4-6). The handle 44 may be utilized for raising and lowering the jack 40. The jack 40 may be mounted at any appropriate position on the jack 40, whereby the with the handle may be oriented so as to be accessible to the user. The jack 40 may also include a base 48. The base 48 may be of any appropriate shape, size, configuration or type. For example, the base 48 may be a wheel for movable engagement with the trailer frame 60 (FIG. 4). Alternatively, the base 48 may be a stationary member, such as a generally circular, square or rectangular member (FIG. 5).

The mounting adapter 10 may be connected to the trailer frame coupler 50 at any appropriate or selected position or orientation (FIGS. 4-6). The trailer frame coupler 50 may be positioned and secured to the trailer frame 60 by any appropriate means, such by fasteners, welding or the like. For example, the mounting adapter 10 may be oriented whereby the jack handle 44 may face away from the trailer frame 60 and towards the towing vehicle (FIG. 4). Alternatively, the mounting adapter 10 may be oriented to allow the handle 44 to face either the driver side or passenger side of the towing vehicle (FIGS. 5 and 6).

To selectively orient the mounting adapter 10 on the trailer frame 60, the mounting apertures 16 of the adapter 10 and the mounting apertures 52 of the trailer frame coupler 50 should be aligned with one another. The mounting apertures 16 may receive any appropriate type of mounting fasteners 54, such as bolts, screws or the like (FIGS. 5 and 6). The apertures 16 may also align with apertures (not shown) located in a trailer frame 60 whereby the mounting adapter 10 may also be connected to the trailer frame 60 (FIGS. 4-6). While the mounting adapter 10 may be described as being secured or screwed onto the trailer frame 60, it is to be understood that the mounting adapter 10 may be secured or connected to the trailer frame 60 by any appropriate means, such as by being bolted, welded, or clamped to the frame 60.

In use, the mounting adapter 10 may be coupled to the jack 40 by sliding the opening 14 over a portion of the jack 40 (FIGS. 2 and 4-6). The rib 30 may be aligned with the slot 42 in the jack 40 to allow vertical adjustment of the mounting adapter 10, while also preventing lateral and axial movement of the jack 40 with respect to the mounting adapter 10. The mounting adapter 10 may be vertically adjusted to the desired location and fixed to the jack 40 by securing the fasteners or bolts 46 (FIG. 2).

The mounting adapter 10 may be connected to the trailer frame 60 and/or the frame coupler 50 (FIGS. 4-6). For example, the apertures 16 in the flange 12 of the mounting adapter 10 may be aligned with the apertures 52 in the frame coupler 50 to provide the desired orientation of the jack 40. The vertically adjustable mounting adapter 10 may include a hole or aperture 16 pattern that may corresponds with mounting apertures 52 in the A-Frame trailer coupler 50. These mounting apertures 16, 52 may be oriented in such a way that the jack 40 may be forward, left, right or rear facing. The mounting adapter 10 may also adjust vertically to the jack 40. The mounting adapter 10 may allow the jack 40 to mount to the A-frame coupler 50 while still having both vertical and axial adjustability.

Fasteners 54 may be inserted through the mounting apertures 16 of the adapter 10 and the mounting adapters 52 of the trailer frame coupler 50 to secure the mounting adapter 10 to the frame coupler 50 (FIGS. 5 and 6). While the mounting adapter 10 may be described as being connected to the jack 40 prior to being connected to the frame coupler 50 or to the trailer frame 60, it is to be understood that the mounting adapter 10 may be connected to the trailer frame 60, the frame coupler 50 or the jack 40 in any appropriate order or sequence, and should not be limited to that shown or described herein.

While the adjustable jack mounting adapter 10 may have been shown or described in use with certain types and configurations of jacks 40, trailers 60 or trailer frame couplers 50, it is to be understood that the mounting adapter 10 may be used with any appropriate type of jack, trailer or coupler and should not be limited in any way to that shown and described herein.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. A mounting system for a towed vehicle, said mounting system comprising:
    a mounting adapter attachable to a frame of the towed vehicle;
    a jack mount located on said mounting adapter;
    a generally vertically adjustable telescopic jack having a mounting member, wherein said mounting member includes first and second end portions generally vertically spaced from one another;
    wherein said mounting member is slidably mated together with said jack mount; and
    a locking element selectively engageable with said mounting member and jack mount, wherein said mounting member and jack mount are selectively lockable at any position between said first and second end portions of said mounting member vertically securing said jack to said mounting adapter.

2. The mounting system of claim 1, wherein said jack remains generally perpendicular to said frame of the towed vehicle regardless of the lockable position between said first and second end portions.

3. The mounting system of claim 1, wherein said jack mount includes at least one aperture.

4. The mounting system of claim 3, wherein said locking element includes a fastener, wherein said fastener engages said aperture to selectively secure said jack to said mounting adapter.

5. The mounting system of claim 1, wherein said mounting member includes a generally vertically extending female member and said jack mount includes a generally vertically extending male member capable of mating with said female member at any position along said female member.

6. The mounting system of claim 1, wherein said mounting member includes a channel that engages said jack mount.

7. The mounting system of claim 6, wherein said jack mount includes a channel mating member slidably mating with said channel.

8. The mounting system of claim 1, wherein said mounting adapter includes a base portion, wherein said base portion generally encompasses said jack when said mounting member engages said jack mount.

9. The mounting system of claim 8, wherein said mounting adapter includes a generally vertical portion generally extending upward from said base, said jack mount positioned on said vertical portion.

10. The mounting system of claim 1, wherein said jack is generally vertically adjustable along an axis and said mounting adapter is capable of rotatably positioning said jack on said frame of the towed vehicle relative to said axis in a variety of fixed positions.

11. The mounting system of claim 1, wherein said mounting adapter comprises:
   a flange having an opening for receiving said jack; and
   a plurality of mounting apertures arranged in a generally radial pattern around said opening.

12. A mounting system for a towed vehicle, said mounting system comprising:
   a telescoping generally vertically oriented jack, wherein said jack is generally vertically adjustable along an axis;
   a mounting member located on said jack;
   a bracket having a jack mount, wherein said jack mount engages said mounting member selectively securing said jack to said bracket; and
   wherein said bracket is selectively mountable on the towed vehicle, wherein said bracket is capable of rotatably positioning said jack on an orthogonal plane relative to said axis.

13. The mounting system of claim 12, wherein said bracket is capable of rotatably positioning said jack in no less than three different positions orthogonally to said axis.

14. The mounting system of claim 12, wherein said mounting member engaging said jack mount generally vertically positions said jack relative to said frame of the towed vehicle.

15. The mounting system of claim 14, wherein said mounting member includes first and second end portions generally vertically spaced from one another and said mounting member engages said jack mount at any position between said first and second end portions of said mounting member.

16. The mounting system of claim 12, wherein said mounting member includes a channel engaging said jack mount.

17. The mounting system of claim 16, wherein said jack mount includes a channel mating member slidably engaging said channel.

18. The mounting system of claim 17, wherein said jack mount includes at least one aperture.

19. The mounting system of claim 18 further comprising a fastener, wherein said fastener selectively engages said aperture and said channel of said mounting member to selectively secure said jack to said bracket.

20. A mounting system for a towed vehicle, said mounting system comprising:
   a telescoping jack generally vertically adjustable along an axis and having a mounting member;
   a handle attached to a side of said jack, said handle having a pivot axis, wherein said handle generally vertically adjusts said jack along said axis;
   a bracket having a jack mount, wherein said jack mount engages said mounting member selectively vertically securing said jack to said bracket; and
   wherein said bracket is selectively mountable on a frame of the towed vehicle, wherein said bracket is capable of rotatably positioning said handle pivot axis orthogonally to said axis in no less than three fixed positions.

21. The mounting system of claim 20, wherein said handle pivot axis is capable of being rotatably positioned orthogonally to said axis in at least six fixed positions.

22. The mounting system of claim 20, wherein said bracket comprises:
   a flange having an opening for receiving said jack; and
   at least three mounting apertures arranged in a generally radial pattern around said opening in said flange.

23. The mounting system of claim 22, wherein said bracket includes six mounting apertures arranged in a generally radial pattern in said flange.

24. The mounting system of claim 20, wherein said mounting member includes first and second end portions generally vertically spaced from one another and said mounting member engages said jack mount at an infinite number of positions between said first and second end portions of said mounting member.

25. The mounting system of claim 20, wherein said mounting member slidably engages said jack mount.

* * * * *